(12) United States Patent
Dandoy

(10) Patent No.: US 7,814,463 B2
(45) Date of Patent: Oct. 12, 2010

(54) USER INTERFACE DEBUGGER FOR SOFTWARE APPLICATIONS

(75) Inventor: Cedric Dandoy, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1730 days.

(21) Appl. No.: 10/439,728

(22) Filed: May 16, 2003

(65) Prior Publication Data
US 2004/0230954 A1 Nov. 18, 2004

(51) Int. Cl.
*G06F 9/44* (2006.01)
(52) U.S. Cl. ...................................... 717/125
(58) Field of Classification Search ......... 717/124–128, 717/141–143
See application file for complete search history.

(56) References Cited

U.S. PATENT DOCUMENTS

| | | | |
|---|---|---|---|
| 6,543,048 B1 * | 4/2003 | Kuzemchak et al. | 717/127 |
| 6,721,941 B1 * | 4/2004 | Morshed et al. | 717/127 |
| 6,802,053 B1 * | 10/2004 | Dye et al. | 717/113 |
| 6,907,546 B1 * | 6/2005 | Haswell et al. | 714/38 |
| 6,941,492 B1 * | 9/2005 | Ezra et al. | 714/38 |
| 6,986,124 B1 * | 1/2006 | Field et al. | 717/124 |

OTHER PUBLICATIONS

Kacsuk et al., "Enhancing GRADE Towards a Professional Parallel Programming Environment", CiteSeer, The 3rd SEIHPC Workshop, Madrid, Spain, 1998.*
Nathan Field, "Debugging Embedded Linux Applications", 2001, Linux Journal, pp. 1-7.*
Sunsoft, "Solstice Enterprise Manager Reference Manual", 1996, Release 2.0, Sun Microsystems, Inc., Chapters 10-23, pp. 355 pages.*
Akerley et al, "Programming with VisualAge for Java", Nov. 1998, IBM, Version 2, pp. 1-381.*

* cited by examiner

*Primary Examiner*—Ted T Vo
(74) *Attorney, Agent, or Firm*—Kraguljac & Kalnay, LLC

(57) ABSTRACT

In one embodiment, a system for debugging a software application is provided. A debug agent, being in an executable form, is configured to be combined with an executable form of the software application, and is configured to monitor events from the software application during run-time. A debugger logic is configured to receive data from the debug agent relating to the monitored events and to communicate debugging requests to the debug agent allowing a user to dynamically debug the software application.

32 Claims, 3 Drawing Sheets

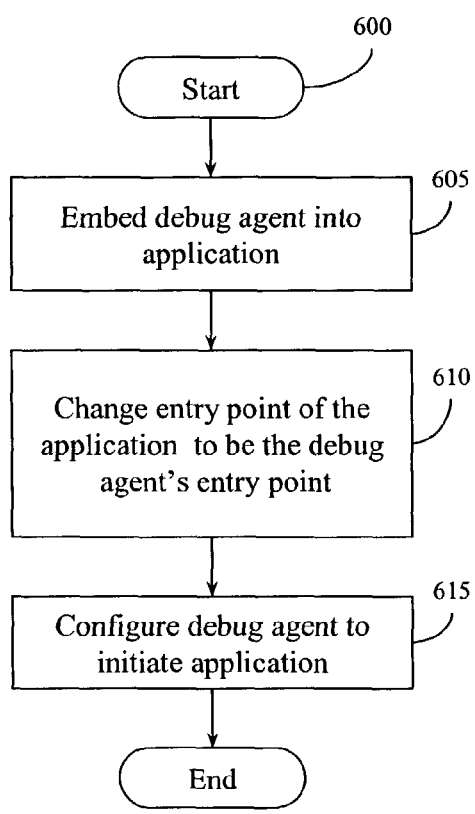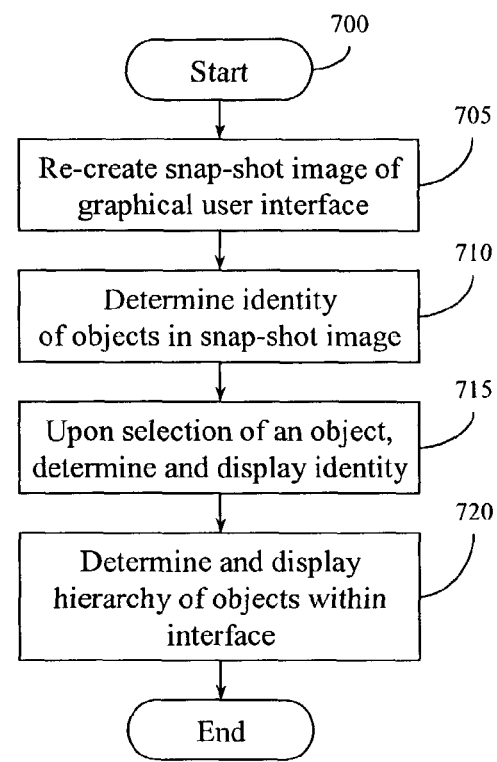
Figure 6
Figure 7

USER INTERFACE DEBUGGER FOR SOFTWARE APPLICATIONS

BACKGROUND

When debugging software code, a user/programmer would typically use a debugger to determine how the software functions during execution. Some basic functions of the debugger are to put breakpoints into the code and to inspect data structures of the inspected software. When debugging a graphical user interface, it is very difficult and time consuming for the programmer to find the relationship between graphical components displayed by the debugged application and the related source code and data structure as exposed by a traditional debugger.

The present invention provides a new and useful method and system for debugging a user interface.

SUMMARY

Not Applicable.

BRIEF DESCRIPTION OF THE DRAWINGS

In the accompanying drawings which are incorporated in and constitute a part of the specification, embodiments of a system and method are illustrated which, together with the detailed description given below, serve to describe the example embodiments of the system and method. It will be appreciated that the illustrated boundaries of elements (e.g. boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vise versa.

FIG. 6 is one embodiment of a methodology for embedding a debug agent into a software application.

FIG. 7 is one embodiment of a methodology for debugging a graphical user interface.

DETAILED DESCRIPTION OF ILLUSTRATED EMBODIMENTS

Figure 1:
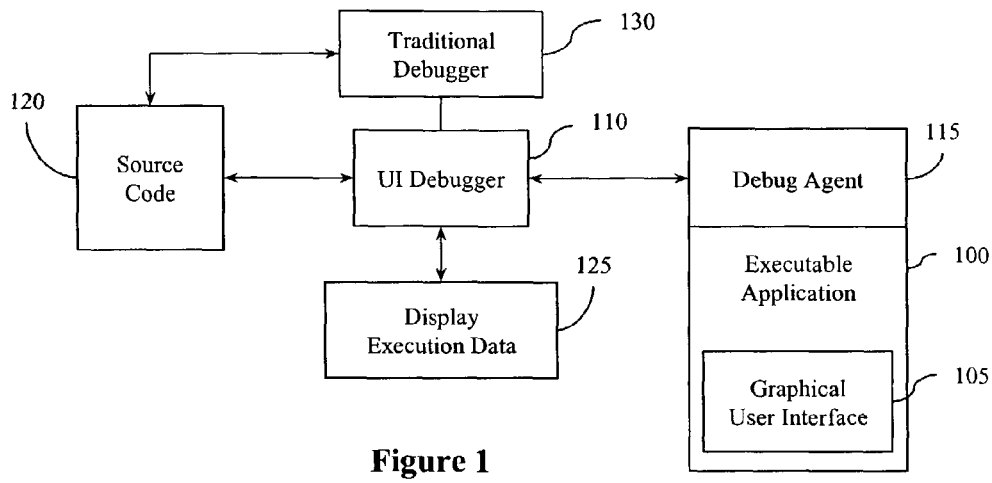
FIG. 1 is an example system diagram of one embodiment of a user interface debugging system.

The following includes definitions of selected terms used throughout the disclosure. The definitions include examples of various embodiments and/or forms of components that fall within the scope of a term and that may be used for implementation. Of course, the examples are not intended to be limiting and other embodiments may be implemented. Both singular and plural forms of all terms fall within each meaning:

"Computer-readable medium", as used herein, refers to a storage medium that participates in directly or indirectly providing signals, instructions and/or data to one or more processors for execution. Such a medium may take many forms, including but not limited to, non-volatile media, and volatile media. Non-volatile media may include, for example, optical or magnetic disks. Volatile media may include dynamic memory. Common forms of computer-readable media include, for example, a floppy disk, a flexible disk, hard disk, magnetic tape, or any other magnetic medium, a CD-ROM, any other optical medium, any other physical medium with patterns of holes, a RAM, a PROM, an EPROM, a FLASH-EPROM, any other memory chip or card, or any other medium from which a computer, a processor or other electronic device can read.

"Logic", as used herein, includes but is not limited to hardware, firmware, software stored on a computer-readable medium and/or combinations of each to perform a function(s) or an action(s), and/or to cause a function or action from another component. For example, based on a desired application or needs, logic may include a software controlled microprocessor, discrete logic such as an application specific integrated circuit (ASIC), a programmable/programmed logic device, memory device containing instructions, or the like.

"Software", as used herein, includes but is not limited to one or more computer readable and/or executable instructions that cause a computer or other electronic device to perform functions, actions, and/or behave in a desired manner. The instructions may be embodied in various forms such as objects, routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software may be dependent on, for example, requirements of a desired application, the environment it runs on, and/or the desires of a designer/programmer or the like.

"User", as used herein, includes but is not limited to one or more persons, software, computers or other devices, or combinations of these.

In one embodiment, a system is provided for assisting a user to debug a graphical user interface of a software application such as a Java client application, applets, or other type of software. The system can determine and display to the user a relationship between a visual image of an executing application and objects that form the image. For example, a button object that is displayed on a screen during run-time has a data object counterpart, typically a JButton. In one embodiment, the system can determine the data object counterpart associated with the on-screen button object, determine its identity or other selected properties, and display the properties which may assist the user in debugging the software. Additional features and embodiments are described below. It will be appreciated that the graphical user interface debugger system can be used with a traditional debugger to debug software.

Illustrated in FIG. 1 is one embodiment of a system configured to assist in debugging an executable software application 100 and, in particular, its graphical user interface 105. The system includes a user interface (UI) debugger 110 and a debug agent 115 which, in one form, can both be embodied as software. The UI debugger 110 can be configured as software that interacts with a user and conveys information regarding the graphical user interface 105 during run-time.

The debug agent 115 includes computer-executable instructions that are configured to be embedded or otherwise combined with the executable application 100. The debug agent 115 is further configured to collect execution data relating to the graphical user interface 105 during run-time. Examples of execution data include object properties, events associated with objects, run-time states of the application 100, and/or other desired run-time data. The execution data can be obtained, for example, by reading state values stored in memory that are maintained for the application during execution. The debug agent 115 is further configured to communicate the collected execution data to the UI debugger 110. In general, the debug agent 115 functions as monitoring software but can also be configured to interact with the application 100 and change run-time values of objects as described below.

In one embodiment, the debugging system can be configured for remote debugging. For example, the user interface debugger 110 can be configured to execute on a first computer while the application 100 can be executed on a second computer. Since the UI debugger 110 is on a separate machine, the UI debugger 110 cannot directly make requests to the operating system of the second computer in order to receive data. Instead, the debug agent 115 is configured to be combined with the application 100 such that the debug agent 115 can communicate with the operating system involved in the execution of the application 100. The UI debugger 110 and the debug agent 115 can then be configured to communicate to each other through a communication channel such as a TCP/IP socket connection. In this manner, the debug agent 115 functions as a spy software for the UI debugger 110. Both in local and remote debugging, the debugger and the agent can use TCP/IP to communicate. One difference between the two embodiments is that in local debugging, the debugger 110 can start the application 100 (and include the agent 115) while in remote debugging, it may be the responsibility of a user to do start the application 100.

In another embodiment, the UI debugger 110 can be configured to execute on the same computer as the executing application 100. For example, if using a Java-based system, the application 100, the debug agent 115, and UI debugger 110 can be run in a common process as part of a virtual machine that can execute Java instructions, or can be run in separate processes.

As stated previously, in one embodiment, the debug agent 115 is embedded into the application 100. If the software is programmed in Java, compiled software has an assigned entry point that indicates where the software is to begin execution. In one embodiment, the UI debugger 110 is configured to programmatically change the entry point of the application 100 to point to the entry point of the debug agent 115. The debug agent 115 is then configured to call or otherwise initiate the application 100 by pointing to the original entry point of the application 100. In this manner, before the application 100 begins execution, the code of the debug agent 115 is executed where it initially configures itself to record execution data, communicate with the application 100, and establish a communication channel with the UI debugger 110.

For example, the agent 115 can request the application 100 to draw a logical representation of itself into memory as a tree structure. The debug agent 115 can also maintain memory references to objects in the tree structure and maintain associations between the object in memory and to the application 100. The tree hierarchical structure of the application can then be communicated to the UI debugger 110 so that the debugger 110 has knowledge of the structure. By embedding the debug agent 115, it can run in parallel with the application 100 and it can monitor states of the application including the states of objects in the user interface 105. As such, the agent can act on the application 100 and can programmatically request the application for its state, its structure, or other information. In this manner, the debug agent 115 can receive image information and properties of objects within the graphical user interface 105 that may be useful to a user while debugging. In this manner, the debug agent 115 is configured to take a snap-shot of current state information of the graphical user interface 105 and provide the state information to the UI debugger 110. The UI debugger 110 can then be configured to generate a graphical state that re-creates the user interface 105 based on the current state information. In another embodiment, the debug agent 115 can be configured to store the state information in a file or other data structure for subsequent use rather than communicating the information directly to the UI debugger 110. In this manner, the debug agent 115 can be configured to exist and operate separate from the UI debugger 110.

The UI debugger 110 can be further configured to associate selected objects from the graphical user interface 105 to its corresponding source code 120, which may include code that will be activated (e.g. executed) in response to an image object being selected. The source code 120 is the source code file that corresponds to the executable version of the application 100. By determining the hierarchy of objects and where their definitions are, the UI debugger 100 can create a mapping between object images from the user interface 105 and the source code 120. For example, if an object is found to be of type "javax.swing.JButton", the UI debugger 110 can be configured to search in one or more source paths for a file called " . . . \javax\swing\JButton.java." The source paths can be defined by a user, by defaults, or combinations of both. A source path is a list of directories (or zip files) under which the source files are found. The relationship between class names (dot separated) and the source file name is defined by Java. In other languages, this mapping can be built by the compiler into a debugging support file. The debug agent 115 can be configured to map objects from the user interface 105 with in-memory objects that can then be displayed, for example, by a traditional debugger 130.

In another embodiment, the UI debugger 110 can further include logic such that it is interactive with a user. For example, the logic can include a user interface that displays execution data 125 received from the debug agent 115 and that can receive debugging requests from the user. Examples of debugging requests may include selecting an object from the graphical user interface 105 and requesting its properties, its hierarchical status, and associated source code. Other debugging requests may include a request to monitor events associated with an object such as events occurring on the object, actions performed on the object when it is clicked, to show listeners such as code that is listening for that event, request to hide or show an object or, requests to show other types of relationships of an object in the application 100 to its source code 120.

In this regard, the debug agent 115 can be configured to receive debugging requests from the UI debugger 110 and process them with the application 100 during run-time. The debug agent 115 can include logic configured to change properties of objects that are generated by the software application 100 during run-time in response to a debugging request from the UI debugger 110. For example, if a user wishes to hide a selected window from the graphical user interface 105, a request can be entered to the UI debugger 110 which is then communicated to the debug agent 115. The debug agent 115 in turn can determine the current state of the selected window and change its properties such that the window is hidden.

For example, in a Java-based environment, the debug agent 115 can be configured to call a method in the application 100 to change properties of objects such as to show an object, hide an object, change colors, or other property changes. Suppose the application 100 was developed using the Abstract Window Toolkit (AWT) and Swing classes. Both AWT and Swing are a large collection of classes for building graphical user interfaces in Java. The debug agent 115 can be configured to use what is called 'reflection' which is the ability to see at runtime names of objects and their methods. For example, the debug agent 115 will understand that an object can emit a MouseEvent because it has a method called addMouseEventListener( ) and another one called removeMouseEventListener( ). When the debug agent 115 is being notified that a mouse event occurred, the agent can use reflection again to see methods such as getX( ), getY( ), isAltDown( ), and others which the debug agent 115 can call and transmit the results associated with the discovered names X, Y and AltDown. Getting the name can also can be done through the traditional debugger which requests the information from the virtual machine.

By communicating with the executing application 100, such as through reflection, the debug agent 115 can dynamically recognize properties of an object and determine events that the object can emit. As such, the debug agent 115 can be configured to observe a selected object and listen for those events. When an event is received, the debug agent 115 can determine the properties of the event and communicate those properties back to the UI debugger 110. In a remote debugging embodiment as described previously, data from the debug agent 115 can be serialized and transmitted through the socket connection to the UI debugger 110.

It will be appreciated that the UI debugger 110 can be integrated with a traditional debugger 130 that can be configured to concurrently debug the application 100. In one embodiment, the traditional debugger 130 is a data-oriented debugger and is configured to inspect the application 100 through its data. For example, the traditional debugger 130 analyzes in-memory data in order to find content associated with a selected object of the application 100. The UI debugger 110 is configured as an image-oriented debugger that inspects the application 100 through its images. Thus, the UI debugger 110 is configured to show images of objects from the application 100 and determine a relationship between on object to the object's content. Integrating the two types of debuggers can further provide a useful debugging system.

Figure 2:
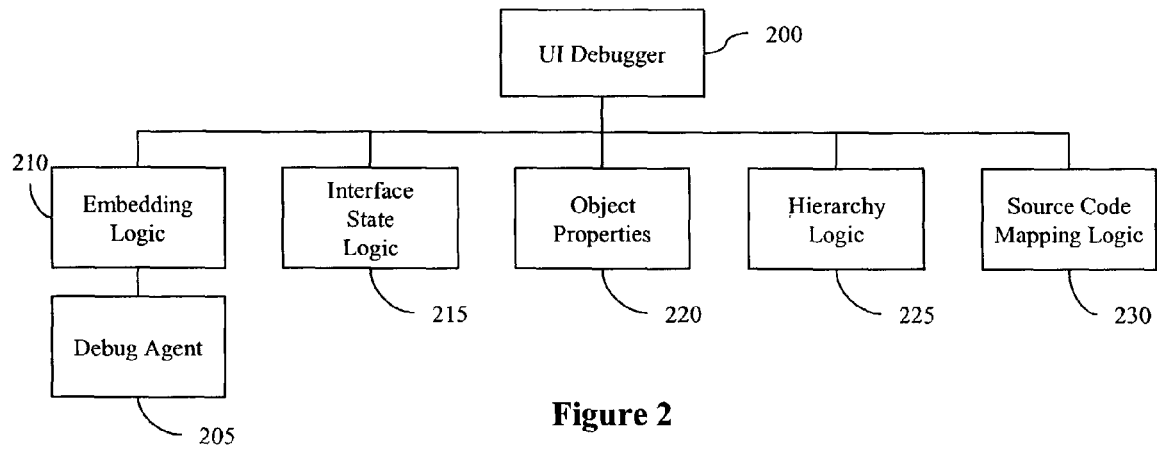
FIG. 2 is another embodiment of a user interface debugging system.

Illustrated in FIG. 2 is another embodiment of a user interface (UI) debugger 200. In one embodiment, the debugger 200 can be embodied as software but may also have one or more components embodied as logic as desired. It will be appreciated that the debugger 200 may also be configured to debug other aspects of a software application instead of or in combination with a user interface of the application. For example, the debugger 200 can be integrated with a traditional debugger as previously mentioned.

The UI debugger 200 is configured to function with a debug agent 205. In one embodiment, the debug agent 205 includes computer-executable instructions configured in an executable form that are configured to be combined with an executable form of a software application that is to be debugged. An embedding logic 210 is provided that is configured to combine or otherwise incorporate the debug agent 205 into the software application. As previously described, the debug agent 205 can be configured to communicate with the software application during run-time, monitor and collect execution data during run-time, communicate data to the UI debugger 200, and process debugging requests from the UI debugger 200.

Figure 4:
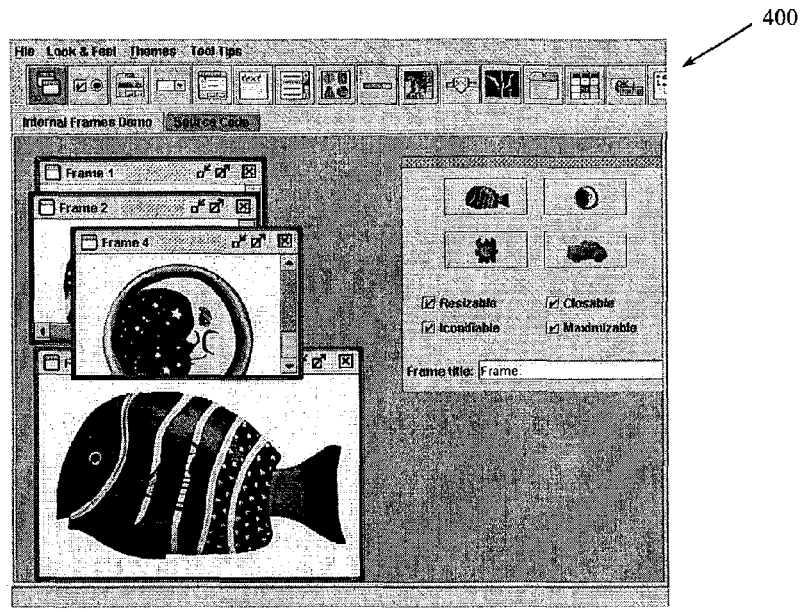
FIG. 4 illustrates one example of a graphical user interface.

With further reference to FIG. 2, an interface state logic 215 can be configured to collect and record a current state of the graphical user interface of the software application being debugged. For example, the interface state logic 215 can be configure to take a snap-shot of state information from an executing graphical user interface thereby capturing properties of its image. The state information can then be used to re-create or simulate the current state of the image of the graphical user interface and display it for debugging purposes. For example, illustrated in FIG. 4 is one example of a display of a graphical user interface 400 that may be part of an executing software application. The graphical user interface 400 may include one or more objects such as windows, buttons, tabs, icons, data entry fields, text, selectable options, menus, or any other type of object desired in a graphical user interface. Other objects may also include panels and frames, all of which can be programmed with one or more properties such as size, color, state, position, and functional properties such as what to do when selected and how to respond to interaction with a user.

Figure 5:
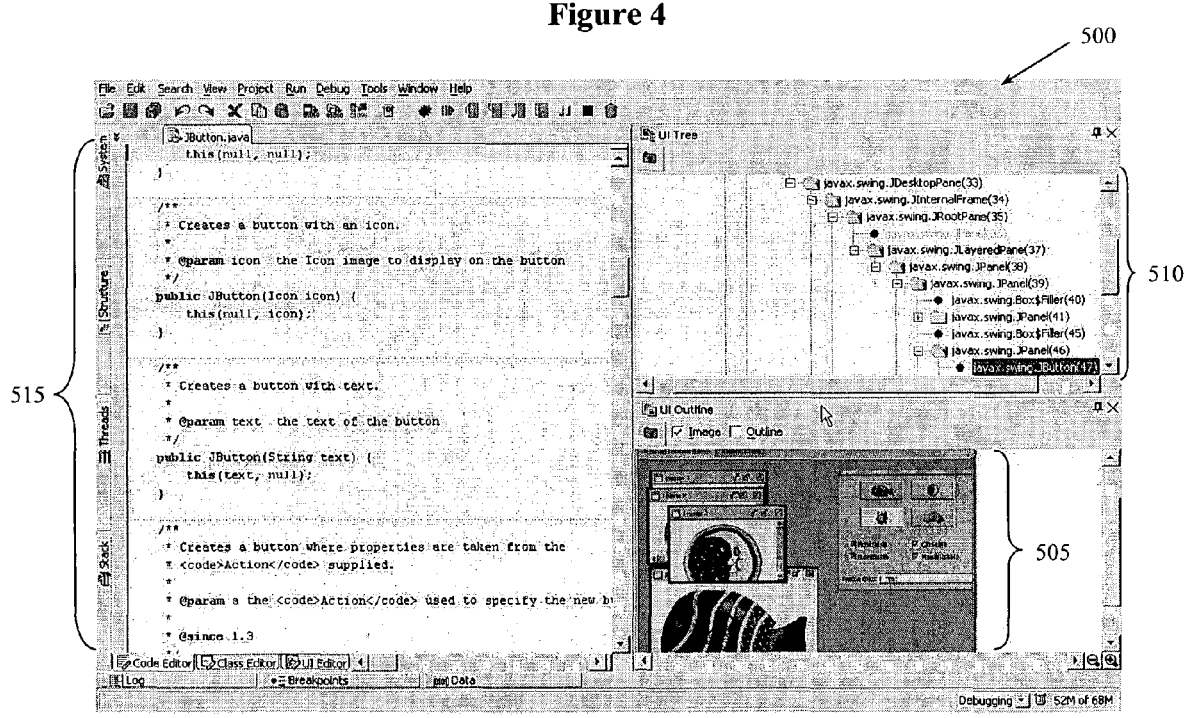
FIG. 5 shown one embodiment of debugging windows from a user interface debugging system.

Illustrated in FIG. 5 is one example of a display from the user interface debugger 200 that can be created when debugging the graphical user interface 400. In one embodiment, the interface state logic 215 is configured to generate an interface snap-shot 505 of a current state of the graphical user interface 400. The interface snap-shot 505 can be displayed in a window. The interface state logic 215 can also be configured to receive execution data from the debug agent 205 such as object properties and states 220 in order to create the interface snap-shot 505. The object properties 220, which may also include event information and other data, can be maintained during debugging. The UI debugger 300 can be configured to allow a user to select when a snap-shot of the graphical user interface 400 is to be taken so that the user can debug different states during execution. For each snap-shot image, the UI debugger 300 associates each on-screen object from the snap-shot image to its properties in the current state information.

With further reference to FIG. 2, a hierarchy logic 225 can be provided that is configured to determine a hierarchy structure of the graphical user interface 400 based on data received from the debug agent 205. The hierarchy structure can be displayed to a user to assist in determining an order of objects and how the objects are defined. An example of a hierarchy structure is shown in FIG. 5 as a tree structure 510. The tree structure 510 illustrates example parent-child relationships between defined objects in the interface snap-shot 505 which correspond to the graphical user interface 400 being debugged. Also shown in tree structure 510 is a highlighted object defined as javax.swing.JButton(47) which can become highlighted upon being selected by the user.

In one embodiment, the interface state logic 215 and the hierarchy logic 225 are configured to respond to events occurring in each window. For example, a user can select (e.g. click on) an object in the simulated interface 505 and the hierarchy logic 225 can be configured to display the hierarchy associated with the selected object and to highlight the selected object in the tree structure 510. The reverse can also be configured where selecting an object in the tree structure 510 can cause the interface state logic 215 to identify the selected object in the interface snap-shot 505. In this manner, selection of components from the interface snap-shot 505 or the tree structure 510 are synchronized.

Additionally, a source code mapping logic 230 can be configured to determine a relationship between a selected object from the simulated interface 505 or tree structure 510 and the source code associated with the selected object. An example of associated source code is shown in FIG. 5 as source code 515. Thus, by selecting an object in the simulated interface 505, the source code associated with that object can be displayed to help a user debug that portion of code. In this manner, the UI debugger 200 can programmatically determine relationships between the executing application and its associated source code which helps a user determine the relationship and where the source code is located. With this relationship, the user does not have to guess which portions of source codes affect certain objects and events within the interface. With some traditional debuggers, this activity could be accomplished by adding breakpoints or debugging statements in the source code.

Figure 3:
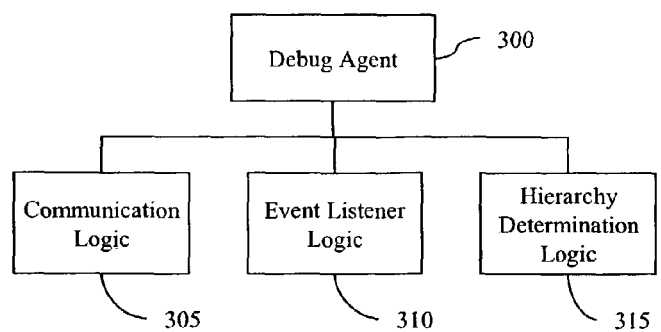
FIG. 3 illustrates one embodiment of a debug agent.

Illustrated in FIG. 3 is another embodiment of a debug agent 300 that can be configured to function with debugger software such as the UI debugger 110, 200 or other embodiments. The debug agent 300 can also be configured to operate asynchronously with a debugger where the debug agent 300 collects data from an executing application and stores the data for later use by a debugger. The debug agent 300 includes computer-executable instructions that are configured to be embedded into a software application being debugged. It will be appreciated that embedding the debug agent 300 may include inserting or appending the agent 300 at any portion of the software application. Embedding can also include creating logical links between the debug agent 300 and software application such that they become one executable program such as by re-assigning addresses, configuring the agent 300 and the application as processes executable in parallel, or other desired configuration. In one embodiment, the debug agent 300 and the software application can be combined such that the same virtual machine or other processing device executes the combined software.

The debug agent 300 can include debugger communication logic 305 configured to establish and perform communication between the agent 300 and the UI debugger 200. In an embodiment where the debug agent 300 is remote from the debugger 200, the debugger communication logic 305 can be configured to establish a TCP/IP connection to the debugger 200 through a network socket. Using the connection, the agent can notify the debugger of its presence, provide required protocol numbers, establish handshaking, and otherwise communicate in accordance with the established communication protocol. Of course, other types of protocols and communication channels may be used such as infrared, Bluetooth, firewire, and other desired protocols. In another embodiment, the debug agent 300 and the UI debugger 200 can be configured to execute on a common computer such that they may communicate between each other without a network communication channel.

With further reference to FIG. 3, the debug agent 300 can be configured with an event listener logic 310. The event listener logic 310, in one embodiment, can be configured to monitor the occurrence of events that happen during run-time on one or more selected objects from the graphical user interface being debugged. The event listener logic 310 can be configured to monitor events using functions from action event listeners and focus event listeners provided by, for example, Swing. An example of an event includes receiving input from a keyboard. For example, this can be performed by adding debugging code and breakpoints to the software code. This feature can help a programmer to see what events are emitted by a component and when. This feature can also be used to understand the sequence of events. For example, when the user clicks on a component, this component usually takes the focus. Tracing the events allows the developer to see what is the sequence of events which could be 1) the mouse button is pressed, 2) the component that had the focus looses the focus, 3) the mouse is release, and 4) an other component gets the focus.

With further reference to FIG. 3, a hierarchy determination logic 315 is configured to determine the hierarchy of a running software application. In general, every window/dialog box or other component has a hierarchy of objects such as buttons, entry fields, panels, and other components that are behind it or on top of it.

For example, the logic 315 can be configured to make requests (e.g. requests to Swing functions) to receive notification when a top level component or window is created or removed. With this information, a tree structure can be created for the top level hierarchy. The hierarchy determination logic 315 can then analyze the top level hierarchy of the user interface and determine parent-child relationships between components. In one embodiment, this can be performed by a recursive analysis on the tree structure.

When a child object is found, object properties can be stored along with a reference to the child object. Object properties may include, for example, class, position, size, visibility, and/or other properties. With this information, the UI debugger 200 can request to show or hide a selected object which then causes the debug agent 300 to change the property of the selected object. For example, the debug agent 300 can be configured to review the hierarchy and modify the object's properties to show or hide the selected object. The debug agent 300 can also be configured to show or hide other components, revalidate a component and the size of a child component, and locate a component. The debug agent 300 can be configured to retrieve the contents of an object if its location is known. The identification of the object can be passed to the traditional debugger which could then display the content of the object's data structure to the user.

Illustrated in FIG. 6 is one embodiment of a methodology 600 for combining the debug agent and a software application to be debugged. The illustrated elements denote "processing blocks" and represent computer software instructions or groups of instructions that cause a computer or processor to perform an action(s) and/or to make decisions. Alternatively, the processing blocks may represent functions and/or actions performed by functionally equivalent circuits such as a digital signal processor circuit, an application specific integrated circuit (ASIC), or other logic device. The diagram, as well as the other illustrated diagrams, does not depict syntax of any particular programming language. Rather, the diagram illustrates functional information one skilled in the art could use to fabricate circuits, generate computer software, or use a combination of hardware and software to perform the illustrated processing. It will be appreciated that electronic and software applications may involve dynamic and flexible processes such that the illustrated blocks can be performed in other sequences different than the one shown and/or blocks may be combined or, separated into multiple components. They may also be implemented using various programming approaches such as machine language, procedural, object oriented and/or artificial intelligence techniques. The foregoing applies to all methodologies described herein.

With reference to FIG. 6, a debug agent can be embedded into the application such that they can execute in parallel (Block 605). In a Java-based environment, executable code includes an entry point or address which is called to initiate the code. As such, the debug agent can be embedded by changing the entry point of the application to point to the entry point of the debug agent (Block 610). In this manner, the environment that executes the application is made to begin executing the debug agent's code rather than the application's code. One example of such an environment is an integrated development environment (IDE). The environment may also include a byte code interpreter that executes Java instructions such as a virtual machine.

The debug agent is then configured to initiate the application by pointing to the entry point of the application (Block

615). In this manner, once the debug agent is ready, it begins execution of the application being debugged. By combining the executable code of the debug agent with the executable code of the application, they can be executed in parallel. From one perspective, the debug agent can be regarded as a spying module that functions within the application, unknown to the application, to monitor the execution of the application.

Illustrated in FIG. 7 is one embodiment of a methodology 700 for debugging a graphical user interface. To begin debugging, a snap-shot of a current state of the graphical user interface of an executing software application is collected. From the current state data, the graphical user interface is re-created as a snap-shot image (Block 705). Thus, an association can be generated between image objects within the snap-shot image and their properties from the current state data. As an object within the snap-shot image is selected by a user, the object is identified and its name is returned (Block 710). The name can be determined, for example, from knowing the association between the current state data and the corresponding object shown in the snap-shot image. If desired, programming code (e.g. source code) associated with the selected object can also be determined once the selected object is identified. Thus, an association can also be created between objects in the snap-shot image to its source code. In another embodiment, the association between objects from a snap-shot image and their current state data and hierarchy can be predetermined and references can be stored on a computer-readable medium. Then, as objects are selected during debugging at a later time, an object can be identified by using the stored references.

In either case, upon selection of an object from the snap-shot image, the object's identity (e.g. its name and/or type) is determined and can be displayed (Block 715). In this manner, a user can automatically have an object's name determined, can determine what occurs when an object is selected, and view properties of the selected object. Optionally, and at any point during debugging, a hierarchy of objects within the interface can be determined and displayed (Block 720). The hierarchy can be displayed automatically, in response to a user request, in response to an object being selected, or other triggering event.

In another embodiment, the block 705 may also include embedding a monitoring module into the software application to monitor and record the execution states of the application. For example, this may include combining a debug agent into the software as previously described.

With the present systems and methods, the debugger can save time to programmers who develop graphical user interfaces. The system can determine and expose the structure of a graphical user interface, display contents and properties of objects, and determine what events are emitted by objects and what parts of the code will be executed in response to events. This can be performed without having a programmer to insert source code into the application such as break points or, code that displays execution-time data that is used to determine how the application is functioning. Using the various embodiments of the debug agent, the source code of the debugged application does not have to me modified. Of course, it will be appreciated that debugging code can be also included into the source code as well as using the debug agent in combination therewith. It will also be appreciated that the user interface debugging system can be combined or used in conjunction with a traditional debugging software tool that does not focus on debugging a user interface. It will also be appreciated that the present systems and methods can be configured to debug software that was created with other programming languages besides Java, or different variants of Java.

Suitable software for implementing the various components of the present systems and methods using the teachings presented here include programming languages and tools such as Java, HTML, Java Server Pages (JSP), Pascal, C#, C++, C, CGI, Perl, APIs, SDKs, assembly, firmware, microcode, and/or other languages and tools. The components embodied as software include computer readable/executable instructions that cause one or more computers, processors and/or other electronic device to behave in a prescribed manner. Any software, whether an entire system or a component of a system, may be embodied as an article of manufacture and maintained as part of a computer-readable medium as defined previously. Another form of the software may include signals that transmit program code of the software to a recipient over a network or other communication medium. It will be appreciated that components described herein may be implemented as separate components or may be combined together.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A system for debugging a software application, the system comprising:
 a debug agent, being in an executable form and stored in a computer-readable medium, configured to be combined with an executable form of the software application, and being configured to monitor events from the software application during run-time;
 embedding logic, including instructions stored in a computer-readable medium that when executed embeds the debug agent into the executable form of the software application; and
 debugger logic configured to receive data from the debug agent relating to the monitored events and to communicate debugging requests to the debug agent allowing a user to dynamically debug the software application.

2. The system for debugging as set forth in claim 1 wherein the debugger logic is configured to simulate graphical user interface images from the software application generated during execution of the software application and associate the simulated graphical user interface images to corresponding in-memory objects.

3. The system for debugging as set forth in claim 1 wherein the debugger logic is configured to simulate image objects from the software application generated during execution of the software application and associate the simulated image objects to in-memory objects that can be displayed by a traditional debugger.

4. The system for debugging as set forth in claim 1 wherein the debug agent is configured to execute in parallel with the software application.

5. The system for debugging as set forth in claim 1 wherein the debug agent is configured to change properties of objects generated by the software application during run-time in response to a debugging request from the debugger logic.

6. The system for debugging as set forth in claim 1 wherein the debug agent is configured to monitor events relating to a graphical user interface of the software application.

7. The system for debugging as set forth in claim 1 wherein the debug agent and the debugger logic are configured to communicate between remote devices.

8. The system for debugging as set forth in claim 1 wherein the debug agent and the debugger logic are configured to execute on a common computer.

9. A system for debugging a user interface of a software application where the software application includes an execution entry point, the system comprising:
- a debug agent configured to collect execution data from a software application;
- embedding logic, including instructions stored in a computer-readable medium, configured to embed the debug agent into the software application by re-assigning the execution entry point to point to the debug agent and, to configure the debug agent to call the software application;
- a user interface debugger configured to display graphical representations of the execution data collected by the debug agent and, to display hierarchical data of the user interface based on the execution data allowing a user to visually debug the user interface; and
- a processor for executing the instructions from the embedding logic.

10. The system as set forth in claim 9 wherein the debug agent includes logic to modify properties of an object.

11. The system as set forth in claim 9 wherein the debug agent is configured to map objects from the user interface with source code associated with the objects.

12. The system as set forth in claim 9 wherein the debug agent is configured to map objects from the user interface with in-memory objects.

13. The system as set forth in claim 9 wherein the user interface debugger includes state logic to generate a graphical image of a current state of the user interface.

14. The system as set forth in claim 9 further including hierarchy logic configured to determine a hierarchical structure of the user interface.

15. The system as set forth in claim 9 wherein the debug agent is further configured to modify properties of objects in the user interface during run-time.

16. A computer-readable medium configured with one or more computer executable instructions for debugging a graphical user interface, the computer-readable medium comprising:
- first computer executable instructions that cause a computer to associate run-time events of the graphical user interface to objects of the graphical user interface; and
- second computer executable instructions that cause a computer to re-create an image of the graphical user interface during run-time and, to display the objects associated with components from the simulated interface when selected.

17. The computer-readable medium as set forth in claim 16 further including:
- third computer executable instructions that cause a computer to display the re-created image of the graphical user interface in a first window and to cause components in the re-created image to be selectable; and
- fourth computer executable instructions that cause a computer to identify a selected component from the re-created image.

18. The computer-readable medium as set forth in claim 16 further including one or more computer executable instructions that cause a computer to embed monitoring software to the graphical user interface where the monitoring software is configured to collect run-time data from the graphical user interface.

19. The computer-readable medium as set forth in claim 18 wherein the monitoring software is configured to collect run-time data by communicating with an operating system that executes the graphical user interface.

20. The computer-readable medium as set forth in claim 16 further including instructions for causing a computer to determine a hierarchy structure of the graphical user interface.

21. The computer-readable medium as set forth in claim 16 further including means for debugging the graphical user interface remotely.

22. A method of debugging a software application that includes a graphical user interface having one or more image objects, the method comprising:
- generating an graphical state including image objects of the graphical user interface of the software application during run-time;
- associating object properties to each of the image objects; and
- upon selection of an image object from the graphical state, identifying the image object from the associated object properties.

23. The method of debugging as set forth in claim 22 further including attaching a monitoring software to the software application that captures state information from the graphical user interface during run-time where the graphical state is generated based on the state information.

24. The method of debugging as set forth in claim 23 wherein the attaching step includes re-assigning an entry point of the software application to the monitoring software.

25. The method of debugging as set forth in claim 22 wherein the generating step includes:
- displaying the graphical state of the graphical user interface; and
- creating selectable links between image objects in the graphical state and an object hierarchy associated with the image objects allowing a user to view programming properties of the objects when selected.

26. The method of debugging as set forth in claim 22 further including displaying objects and source code that will execute when an event occurs on a image object selected from the graphical state.

27. The method of debugging as set forth in claim 22 further including displaying a hierarchy of objects from the graphical user interface based on the graphical state.

28. The method of debugging as set forth in claim 27 further including, upon a selection of an object from the hierarchy of objects, displaying associated programming code for the object selected.

29. A method of debugging a software application that includes a graphical user interface, the method comprising the steps of:
- embedding a debug agent into the software application that monitors execution data associated with the graphical user interface;
- executing the debug agent and the software application in parallel;
- communicating the execution data to a debugger; and
- displaying the execution data to be debugged.

30. The method as set forth in claim 29 wherein the communicating step includes storing the execution data in a file for subsequent use by a debugger.

31. A debugging system comprising:

a memory;

a data-oriented debugger, including instructions stored in the memory, configured to inspect execution data from an executing software application;

an image-oriented debugger configured to inspect execution data relating to a graphical user interface generated by the executing software application; and embedding logic that embeds executable code of the image-oriented debugger into an executable code of the software application.

32. The debugging system as set forth in claim 31 wherein the image-oriented debugger is configured to associate in-memory properties with corresponding image objects displayed by the graphical user interface.

* * * * *